United States Patent
Huang et al.

(10) Patent No.: US 10,664,011 B2
(45) Date of Patent: May 26, 2020

(54) WEARABLE APPARATUS AND METHOD FOR CONTROLLING VR APPARATUS

(71) Applicant: JRD COMMUNICATION (SHENZHEN) LTD., Shenzhen, Guangdong Province (CN)

(72) Inventors: Yanliang Huang, Shenzhen (CN); Xufeng Wu, Shenzhen (CN)

(73) Assignee: JRD COMMUNICATION (SHENZHEN) LTD., Shenzhen, Guangdong Province (CN)

( * ) Notice: Subject to any disclaimer, the term of this patent is extended or adjusted under 35 U.S.C. 154(b) by 64 days.

(21) Appl. No.: 15/577,300

(22) PCT Filed: Dec. 19, 2016

(86) PCT No.: PCT/CN2016/110676
§ 371 (c)(1),
(2) Date: Nov. 27, 2017

(87) PCT Pub. No.: WO2017/215223
PCT Pub. Date: Dec. 21, 2017

(65) Prior Publication Data
US 2019/0018444 A1    Jan. 17, 2019

(30) Foreign Application Priority Data
Jun. 16, 2016   (CN) .......................... 2016 1 0439119

(51) Int. Cl.
*G09G 1/00*     (2006.01)
*G06F 1/16*     (2006.01)
(Continued)

(52) U.S. Cl.
CPC ............. *G06F 1/163* (2013.01); *G02B 27/01* (2013.01); *G02B 27/017* (2013.01); *G06F 3/011* (2013.01);
(Continued)

(58) Field of Classification Search
CPC . G06F 3/017; G06F 3/01; G06F 15/16; G06F 17/30; H04L 29/06; H04L 29/08
See application file for complete search history.

(56) References Cited

U.S. PATENT DOCUMENTS

| | | | |
|---|---|---|---|
| 8,964,298 B2 | 2/2015 | Haddick et al. | |
| 2013/0127980 A1* | 5/2013 | Haddick | G06F 3/013 |
| | | | 348/14.08 |

(Continued)

FOREIGN PATENT DOCUMENTS

| CN | 102981758 A | 3/2013 |
|---|---|---|
| CN | 103946732 A | 7/2014 |

(Continued)

*Primary Examiner* — Michael A Faragalla
(74) *Attorney, Agent, or Firm* — Cheng-Ju Chiang

(57) ABSTRACT

A VR system, a wearable apparatus and a method for controlling a VR apparatus are disclosed. The wearable apparatus comprises a communication circuit, a processor, and a touch screen which are connected to one another successively; the communication circuit establishes a connection to the processor, and is configured to acquire control request information; the processor displays a control interface on the touch screen based on the control request information, generates control information based on touch actions performed on the control interface, and further sends the control information to the VR apparatus to control the VR apparatus via the control information. In this way, the present application may improve the user experience.

12 Claims, 4 Drawing Sheets

(51) Int. Cl.
  *G02B 27/01* (2006.01)
  *G06F 3/01* (2006.01)
  *G06F 3/0484* (2013.01)
  *G06F 3/0488* (2013.01)

(52) U.S. Cl.
  CPC ...... *G06F 3/04842* (2013.01); *G06F 3/04847* (2013.01); *G06F 3/04883* (2013.01)

(56) References Cited

U.S. PATENT DOCUMENTS

| | | |
|---|---|---|
| 2015/0063661 A1 | 3/2015 | Lee et al. |
| 2015/0111558 A1* | 4/2015 | Yang ..................... G04G 21/04 455/418 |
| 2016/0034042 A1* | 2/2016 | Joo .................... G02B 27/0172 345/633 |

FOREIGN PATENT DOCUMENTS

| | | |
|---|---|---|
| CN | 105320279 A | 2/2016 |
| CN | 105323616 A | 2/2016 |
| CN | 106094203 A | 11/2016 |

* cited by examiner

WEARABLE APPARATUS AND METHOD FOR CONTROLLING VR APPARATUS

CROSS-REFERENCE TO RELATED APPLICATIONS

The present application is a 35 U.S.C. § 371 National Phase conversion of International (PCT) Patent Application No. PCT/CN2016/110676, filed on Dec. 19, 2016, which claims foreign priority of Chinese Patent Application No. 201610439119.8, filed on Jun. 16, 2016 in the State Intellectual Property Office of China, the contents of all of which are hereby incorporated by reference. The PCT Application was filed in Chinese.

TECHNICAL FIELD

Embodiments of the present disclosure generally relate to virtual reality apparatus technology, and in particular relate to a VR system, a wearable apparatus and a method for controlling a VR apparatus.

BACKGROUND

At present, VR (Virtual Reality) apparatuses become more and more widely used. A VR apparatus is integrated with multiple techniques including computer graphics, simulation, multimedia, artificial intelligence, computer networks, parallel processing, multiple sensors, and the like. The VR apparatus may simulate sensory functions including vision, hearing, touching, and the like. In this way, a user may immerse into virtual environment generated by a computer, and further interact with it using natural ways such as languages, gestures and the like, and thus humanized multidimensional information space may be created.

For the VR apparatus of the prior art, such as a VR helmet, hands of the user need to be placed on the VR helmet all the time to operate the game when the user is playing game via the VR helmet. In this way, the hands of the user may be very tired after a game is finished, and thus the user experience is poor.

SUMMARY

The technical problem which the present disclosure mainly solves is to provide a VR system, a wearable apparatus and a method for controlling a VR apparatus, which is capable of solving the technical problems described above.

In order to solve the above technical problem, a technical scheme adopted by the present disclosure is to provide a wearable apparatus for controlling a VR apparatus, which comprises a communication circuit, a processor, and a touch screen which are connected to one another successively; wherein the communication circuit establishes a connection to the VR apparatus, and is configured to acquire control request information; the processor displays a control interface on the touch screen based on the control request information, generates control information based on at least one of touch actions performed on the control interface, and further sends the control information to the VR apparatus via the communication circuit, so as to control the VR apparatus via the control information; when the control interface is displayed on the touch screen, the touch screen goes black; the control interface includes a back key; the touch actions comprise sliding up, sliding down, sliding to the left, sliding to the right and tapping; the corresponding control information comprises moving up, moving down, moving to the left, moving to the right, and confirming.

In one embodiment of the present disclosure, the communication circuit is connected to the VR apparatus via a Bluetooth connection or a WiFi connection.

In one embodiment of the present disclosure, the wearable apparatus is a smartwatch.

In order to solve the above technical problem, still another technical scheme adopted by the present disclosure is to provide a method for controlling a VR apparatus. The method comprises:

a wearable apparatus establishing a connection to the VR apparatus; the VR apparatus generating control request information, and sending the control request information to the wearable apparatus;

the wearable apparatus displaying a control interface based on the control request information;

the wearable apparatus acquiring at least one of touch actions on the control interface, and generating control information based on the at least one of touch actions;

the wearable apparatus sending the control information to the VR apparatus;

the VR apparatus acquiring thee control information and performing operations corresponding to the control information.

In one embodiment of the present disclosure, the displaying the control interface based on the control request information comprises:

a touch screen of the wearable apparatus going black when the wearable apparatus is displaying the control interface.

In one embodiment of the present disclosure, the touch actions comprise sliding up, sliding down, sliding to the left, sliding to the right and tapping; the corresponding control information comprises moving up, moving down, moving to the left, moving to the right, and confirming.

In one embodiment of the present disclosure, the wearable apparatus establishing the connection to the VR apparatus comprises:

when the wearable apparatus is allowed to establish a connection the VR apparatus, the wearable apparatus sending a connection-establishment response to the VR apparatus, and the connection between the wearable apparatus and the VR apparatus being established successfully.

In one embodiment of the present disclosure, the wearable apparatus establishing a connection to the VR apparatus comprises:

when the wearable apparatus is not allowed to establish connection to the VR apparatus, the wearable apparatus sending a response denying the connection establishment to the VR apparatus, and the wearable apparatus and the VR apparatus failing to establish connection therebetween.

In one embodiment of the present disclosure, the wearable apparatus is connected to the VR apparatus via a Bluetooth connection or a WiFi connection.

In order to solve the above technical problem, still another technical scheme adopted by the present disclosure is to provide a VR system, comprising a VR apparatus and a wearable apparatus connected to the VR apparatus, wherein the wearable apparatus comprises a communication circuit, a processor, and a touch screen which are connected to one another successively; the communication circuit establishes a connection to the VR apparatus, and is configured to acquire control request information; the processor displays a control interface on the touch screen based on the control request information, generates control information based on at least one of touch actions performed on the control interface, and further sends the control information to the VR apparatus via the communication circuit, so as to control the VR apparatus via the control information.

In one embodiment of the present disclosure, when the control interface is displayed on the touch screen, the touch screen goes black; the control interface includes a back key.

In one embodiment of the present disclosure, the touch actions comprise sliding up, sliding down, sliding to the left, sliding to the right and tapping; the corresponding control information comprises moving up, moving down, moving to the left, moving to the right, and confirming.

In one embodiment of the present disclosure, the communication circuit is connected to the VR apparatus via a Bluetooth connection or a WiFi connection.

In one embodiment of the present disclosure, the wearable apparatus is a smartwatch.

The present disclosure may achieve the following advantageous effects: different from the prior art, the wearable apparatus provided in the present disclosure comprises a communication circuit, a processor, and a touch screen which are connected to one another successively; wherein the communication circuit establishes a connection to the VR apparatus, and is configured to acquire control request information; the processor displays a control interface on the touch screen based on the control request information, generates control information based on at least one of touch actions performed on the control interface, and further sends the control information to the VR apparatus via the communication circuit, so as to control the VR apparatus via the control information. During the operation of the VR apparatus, the use does not need to place his/her hands on the VR apparatus, the hands may be free, and the user experience may be improved.

BRIEF DESCRIPTION OF THE DRAWINGS

In order to make the technical solution described in the embodiments of the present disclosure more clearly, the drawings used for the description of the embodiments will be briefly described. Apparently, the drawings described below are only parts of the embodiments of the present disclosure; one skilled in the art may obtain other drawings based on these drawings, without making any inventive work.

DETAILED DESCRIPTION

The technical solution described in the embodiments of the present disclosure will be described more clearly and completely in connection with the drawings used for the description of the embodiments. Apparently, the embodiments described below are only parts of the embodiments of the present disclosure, not all of the embodiments. It should be understood that, one skilled in the art may obtain other embodiments based on these embodiments described in the present disclosure, without making any inventive work. Theses all belong to the protection scope of the present disclosure.

Figure 1:
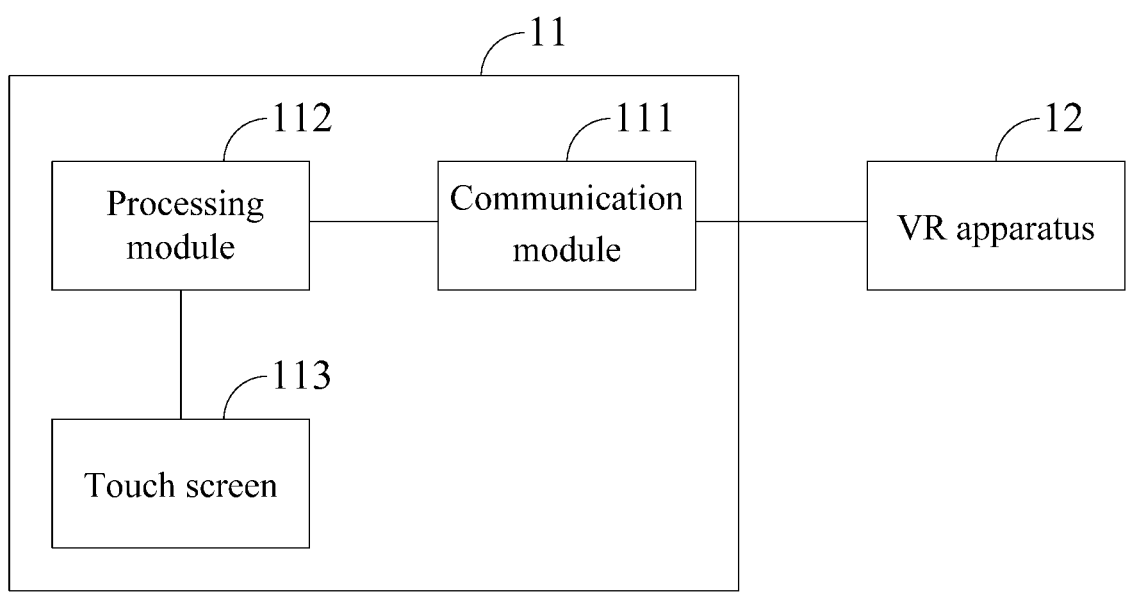
FIG. 1 is a schematic view of one embodiment of a wearable apparatus of the present disclosure.

Referring to FIG. 1, a schematic view of a first embodiment of a wearable apparatus of the present disclosure is depicted. The wearable apparatus 11 disclosed in this embodiment may be configured to control a VR apparatus 12. As is shown in FIG. 1, the wearable apparatus 11 may include a communication circuit 111, a processor 112, and a touch screen 113 which are connected to one another successively. Wherein the communication circuit 111 may establish a connection to the processor 112.

When the VR apparatus 12 is started up, the VR apparatus 12 may send a connection request to the communication circuit 111. When the wearable apparatus 11 is allowed to establish connection to the VR apparatus 12, the communication circuit 111 may send a connection-establishment response to the VR apparatus 12, and the connection between the communication circuit 111 and the VR apparatus 12 may be established successfully. However, when the wearable apparatus 11 is not allowed to establish connection to the VR apparatus 12, the communication circuit 111 may send a response denying the connection establishment to the VR apparatus 12, thereby the communication circuit 111 and the VR apparatus 12 fail to establish connection therebetween.

Figure 2:
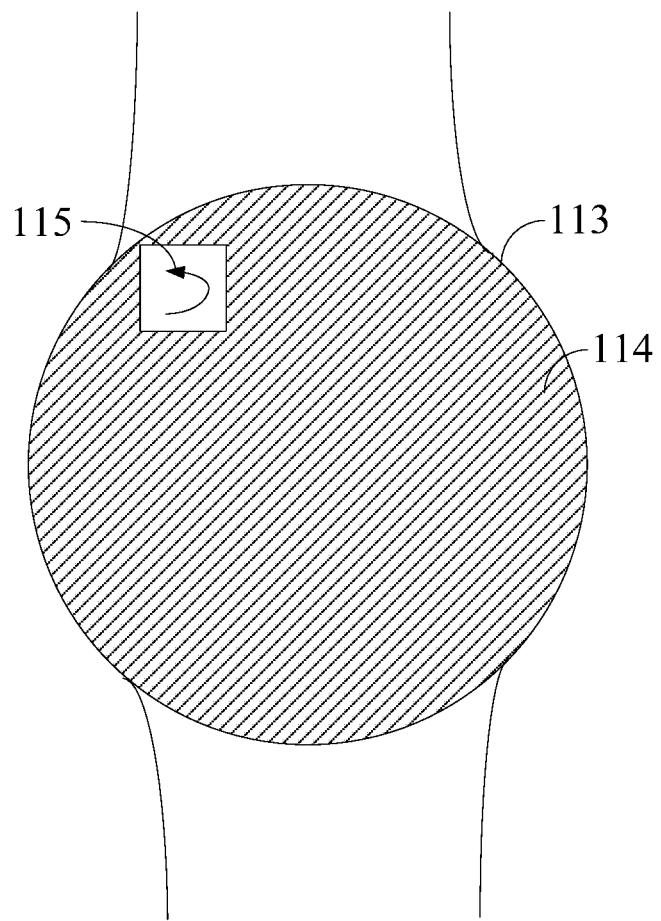
FIG. 2 is a schematic view of the control interface of the wearable apparatus shown in FIG. 1.

After the connection between the communication circuit 111 and the VR apparatus 12 is established successfully, the VR apparatus 12 may generate control request information, and further send the control request information to the communication circuit 111. The control request information may be configured to request the wearable apparatus 11 to control the VR apparatus 12. The communication circuit 111 may be configured to acquire the control request information. The processor 112 may acquire the control request information from the communication circuit 111, and display a control interface 114 on the touch screen 113 based on the control request information, as is shown in FIG. 2. Optionally, when the control interface 114 is displayed on the touch screen 113, the screen of the touch screen 113 may go black; that is, the control interface 114 is black. In this way, it is possible to save power and further extend the battery life of the wearable apparatus 11.

As is shown in FIG. 2, the control interface 114 may further include a back key 115 arranged at an upper-left corner of the touch screen 113, in order to avoid the user from producing a touch action by mistake when performing touch actions on the control interface 114. The control interface 114 may be closed and the screen of the touch screen 113 return to its former state when the back key 115 is pressed.

A finger of the user may perform at least one of the touch actions on the control interface 114. The processor 112 may acquire the at least one of the touch actions on the control interface 114 via the touch screen 113, and generate control information based on the at least one of the touch actions. Optionally, the touch action may comprise sliding up, sliding down, sliding to the left, sliding to the right, tapping, and the like. The processor 112 may generate corresponding control information based on the at least one of the touch actions, and the control information may include moving up, moving down, moving to the left, moving to the right, confirming, and the like. For example, when the finger of the user is sliding up on the control interface 114, the control information generated by the processor 112 is moving up; when the finger of the user is sliding down on the control interface 114, the control information generated by the processor 112 is moving down; when the finger of the user is tapping on the control interface 114, the control information generated by the processor 112 is confirming.

In other embodiments, one skilled in the art may further perform other touch actions on the control interface 114. For example, when the touch action is sliding to the left, the corresponding control information is moving to the left; while the touch action is sliding to the right, the corresponding control information is moving to the right.

The processor 112 may send the control information to the VR apparatus 12 via the communication circuit 111. The VR apparatus 112 may acquire the control information and perform corresponding operations based on the control information. In this way, the wearable apparatus 11 may control the VR apparatus 12 based on the control information.

Optionally, the communication circuit 111 may be connected to the VR apparatus 12 via a Bluetooth connection or a WiFi connection.

Optionally, the wearable apparatus 11 may be a smartwatch, and may be worn on the wrist of the user.

The user may control the VR apparatus 12 via the wearable apparatus 11 as described in detail as follow.

The user may wear the wearable apparatus 11 on the wrist. After the VR apparatus 12 is started up, the connection between the VR apparatus 12 and the communication circuit 111 of the wearable apparatus 11 may be established. The processor 112 of the wearable apparatus 11 may acquire the control request information from the communication circuit 111, and may further display the control interface 114 on the touch screen 113 based on the control request information.

Figure 3:
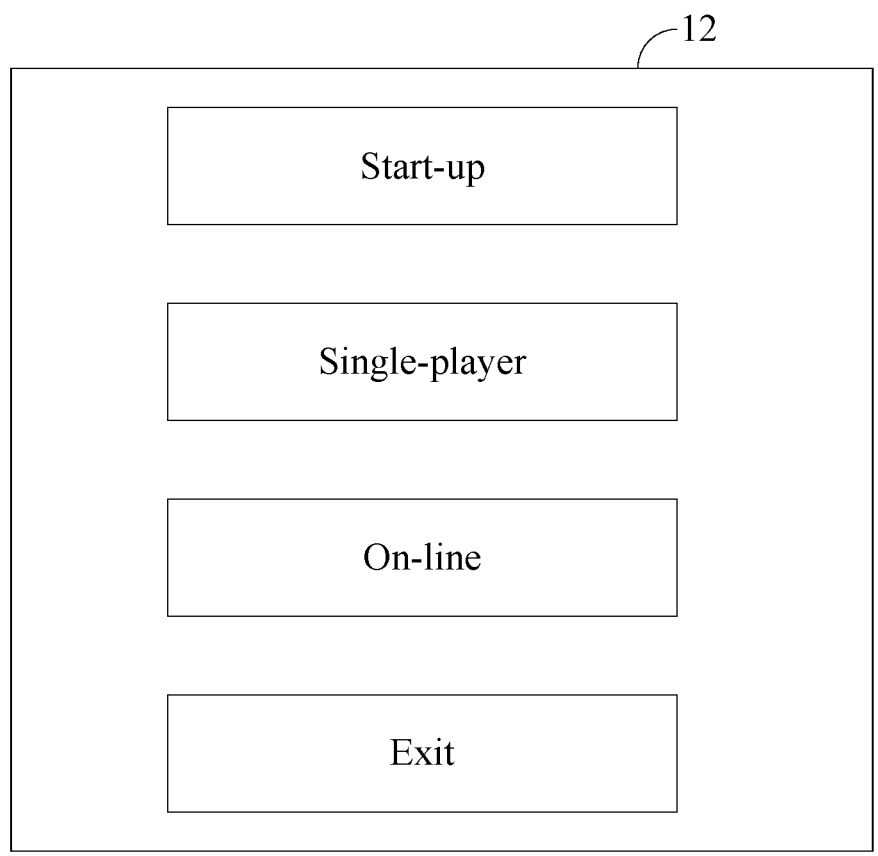
FIG. 3 is a schematic view of the display menu of the VR apparatus.

As is shown in FIG. 3, a menu may be displayed on the VR apparatus 12. The menus successively listing from top to down are start-up menu, single-player menu, on-line menu, and exit menu. The VR apparatus display the on-line menu by default. When the user needs to select the start-up menu, the finger of the user may perform the touch action of sliding up on the control interface 114 of the wearable apparatus 11. The processor 112 generates the control information of moving up, and the VR apparatus 12 moves upwardly to the single-player menu based on the control information. When the finger of the user further performs the touch action of sliding up on the control interface 114 of the wearable apparatus 11, the VR apparatus 12 moves to the start-up menu. When the finger of the user performs the touch action of tapping on the control interface 114 of the wearable apparatus 11, the VR apparatus 12 confirms to enter the start-up menu and enters the game.

When the VR apparatus 12 enters a shooting game, the finger of the user may perform the touch action of tapping on the control interface 114 of the wearable apparatus 11, and the shooting may be achieved by the VR apparatus 12.

In this embodiment, the wearable apparatus 11 may include the communication circuit 111, the processor 112 and the touch screen 113 connected to one another successively. The communication circuit 111 may establish a connection to the VR apparatus 12. The user may perform the touch actions on the control interface 114 of the wearable apparatus 11, and the wearable apparatus may further generate the control information configured to control the VR apparatus 12. In this way, the user does not need to place his/her hands on the VR apparatus 12, the hands may be free, and the user experience may be improved.

Figure 4:
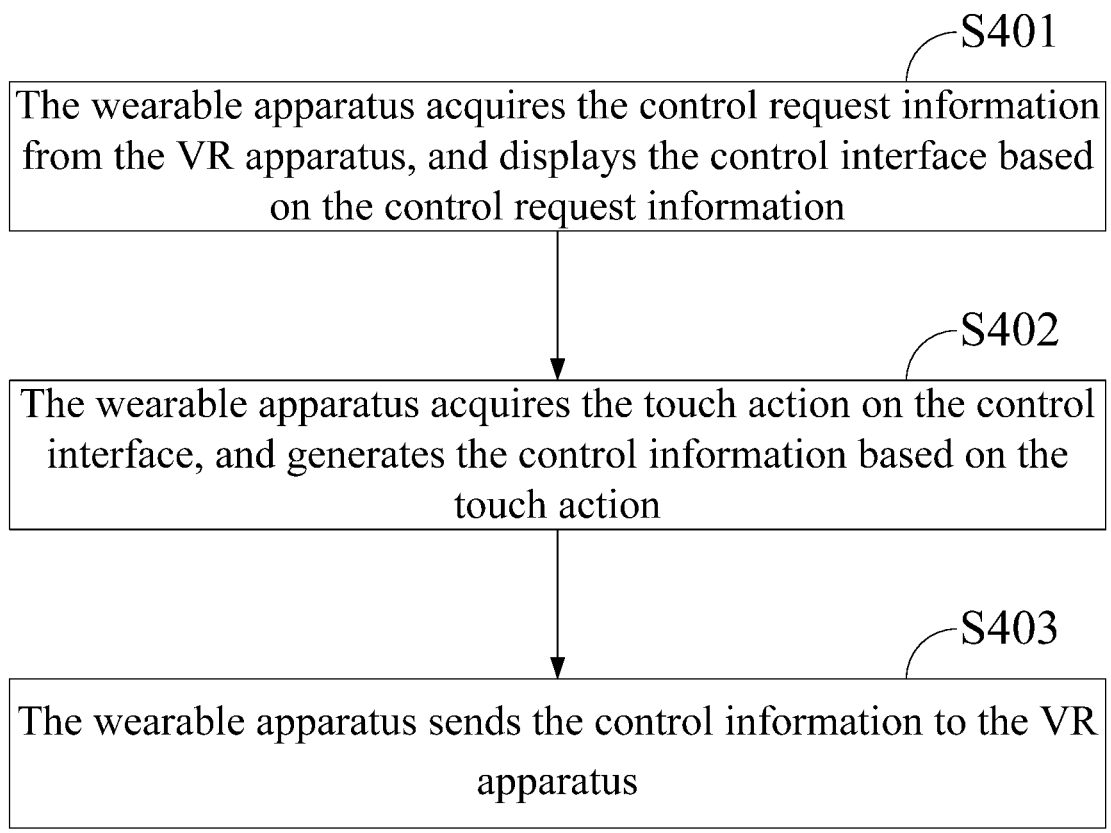
FIG. 4 is a flow chart of a method for controlling the VR apparatus of one embodiment of the present disclosure.

A method for controlling the VR apparatus is further provided in the present disclosure. The method will be described in detail based on the wearable apparatus 11 disclosed in the embodiment of FIG. 1. The method disclosed in this embodiment is suitable for the wearable apparatus 11. As is shown in FIG. 4, the method disclosed in this embodiment may comprise the following blocks.

At block S401: the wearable apparatus 11 may acquire the control request information from the VR apparatus 12, and display the control interface 114 based on the control request information.

At block S402: the wearable apparatus 11 may acquire the touch action on the control interface 114, and generate the control information based on the touch action.

At block S403: the wearable apparatus 11 may send the control information to the VR apparatus 12.

At the block S401, the wearable apparatus 11 may establish a connection to the VR apparatus 12. The VR apparatus 12 may generate the control request information and send the control request information to the wearable apparatus 11.

As is shown in FIG. 2, when the wearable apparatus 11 displays the control interface 114, the touch screen 113 of the wearable apparatus 11 may go black; that is, the control interface 114 is black. In this way, it is possible to save power and extend the battery life of the wearable apparatus 11. The control interface 114 may further include a back key 115 arranged at an upper-left corner of the touch screen 113, in order to avoid the user from producing a touch action by mistake when performing the touch actions on the control interface 114. The control interface 114 may be closed and the screen of the touch screen 113 return to its former state when the back key 115 is pressed.

At the block S402, the wearable apparatus 11 may acquire the touch action on the control interface 114 via the touch screen 113, and further generate the control information based on the touch action. Optionally, the touch action may include sliding up, sliding down, sliding to the left, sliding to the right, tapping, and the like. The wearable apparatus 11 may generate corresponding control information based on at least one of the touch actions, and the control information may include moving up, moving down, moving to the left, moving to the right, confirming, and the like. For example, when the finger of the user is sliding up on the control interface 114, the control information generated by the wearable apparatus 11 is moving up; when the finger of the user is sliding down on the control interface 114, the control information generated by the wearable apparatus 11 is moving down; when the finger of the user is tapping on the control interface 114, the control information generated by the wearable apparatus 11 is confirming.

In other embodiments, one skilled in the art may further perform other touch actions on the control interface 114. For example, when the touch action is sliding to the left, the corresponding control information is moving to the left; while the touch action is sliding to the right, the corresponding control information is moving to the right.

At the block S403: the wearable apparatus 11 may send the control information to the VR apparatus 12. The VR apparatus 12 may acquire the control information, and perform the corresponding operations based on the control information. In this way, it is possible for the wearable apparatus 11 to control the VR apparatus 12 via the control information.

Figure 5:
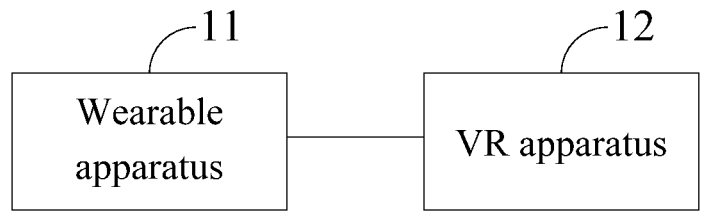
FIG. 5 is a schematic view of a VR system of one embodiment of the present disclosure.

The present disclosure further provides a VR system. As is shown in FIG. 5, the VR system 50 disclosed in this embodiment may include a VR apparatus 12 and a wearable apparatus 11 connected to the VR apparatus 12. Considering also FIG. 1, the wearable apparatus 11 may include the communication circuit 111, the processor 112 and the touch screen 113 which are connected to one another successively. The communication circuit 111 may establish a connection to the VR apparatus 12.

When the VR apparatus 12 is started up, the VR apparatus 12 may send a connection request to the communication circuit 111. When the wearable apparatus 11 is allowed to establish connection to the VR apparatus 12, the communication circuit 111 may send a connection-establishment response to the VR apparatus 12, and the connection between the communication circuit 111 and the VR apparatus 12 may be established successfully. However, when the wearable apparatus 11 is not allowed to establish connection to the VR apparatus 12, the communication circuit 111 may send a response denying the connection establishment to the VR apparatus 12, thereby the communication circuit 111 and the VR apparatus 12 fail to establish connection therebetween.

After the connection between the communication circuit 111 and the VR apparatus 12 is established successfully, the VR apparatus 12 may generate the control request information, and further send the control request information to the communication circuit 111. The control request information may be configured to request the wearable apparatus 11 to control the VR apparatus 12. The communication circuit 111 may be configured to acquire the control request information. The processor 112 may acquire the control request information from the communication circuit 111, and display the control interface 114 on the touch screen 113 based on the control request information, as is shown in FIG. 2. Optionally, when the control interface 114 is displayed on the touch screen 113, the screen of the touch screen 113 may go black; that is, the control interface 114 is black. In this way, it is possible to save power and further extend the battery life of the wearable apparatus 11.

As is shown in FIG. 2, the control interface 114 may further include a back key 115 arranged at an upper-left corner of the touch screen 113, in order to avoid the user from producing a touch action by mistake when performing touch actions on the control interface 114. The control interface 114 may be closed and the screen of the touch screen 113 returns to its former state when the back key 115 is pressed.

When a finger of the user is performing at least one of touch actions on the control interface 114, the processor 112 may acquire the at least one of the touch actions on the control interface 114 via the touch screen 113, and generate the control information based on the at least one of the touch actions. Optionally, the touch action may comprise sliding up, sliding down, sliding to the left, sliding to the right, tapping, and the like. The processor 112 may generate the corresponding control information based on the at least one of the touch actions, and the control information may include moving up, moving down, moving to the left, moving to the right, confirming, and the like. For example, when the finger of the user is sliding up on the control interface 114, the control information generated by the processor 112 is moving up; when the finger of the user is sliding down on the control interface 114, the control information generated by the processor 112 is moving down; when the finger of the user is tapping on the control interface 114, the control information generated by the processor 112 is confirming.

In other embodiments, one skilled in the art may further perform other touch actions on the control interface 114. For example, when the touch action is sliding to the left, the corresponding control information is moving to the left; while the touch action is sliding to the right, the corresponding control information is moving to the right.

The processor 112 may send the control information to the VR apparatus 12 via the communication circuit 111. The VR apparatus 112 may acquire the control information and perform the corresponding operations based on the control information, and thus the wearable apparatus 11 may control the VR apparatus 12 based on the control information.

In conclusion, the wearable apparatus may include a communication circuit, a processor and a touch screen which are connected to one another successively; the communication circuit may establish a connection to the VR apparatus, and may be configured to acquire the control request information. The processor may display the control interface on the touch screen based on the control request information, generate the control information based on the touch actions on the control interface, and further send the control information to the VR apparatus via the communication circuit. The wearable apparatus may control the VR apparatus via the control information. During the operation of the VR apparatus, the user does not need to place his/her hands on the VR apparatus 12, the hands may be free, and the user experience may be improved.

It is to be understood that, the methods disclosed in the embodiments of the present disclosure may be implemented in the form of software functional units and utilized and sold independently. The above-mentioned modules may be stored in the ROM of a computing device. Based on this comprehension, the parts which contribute to the embodiments of the present disclosure may be implemented in the form of software product, and the software product may be stored in a storage medium including several instructions which is configured to execute all or part of the blocks described in the above-mentioned embodiments of the present disclosure on a virtual reality or augmented reality device or on a processor. The above-mentioned storage medium may include: USB flash disk, mobile HDD, ROM, RAM, disk or any medium used for storing program code.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the disclosure on other related fields, shall all be covered within the protection of the present disclosure.

What is claimed is:

1. A method for controlling a virtual reality (VR) apparatus, comprising:
   a wearable apparatus establishing a connection to the VR apparatus and receiving control request information generated by the VR apparatus, wherein the control request information is configured to request the wearable apparatus to control the VR apparatus;
   the wearable apparatus displaying a control interface based on the control request information, wherein the control interface is black;
   the wearable apparatus acquiring at least one of touch actions on the control interface, and generating corresponding control information based on the at least one of touch actions, wherein the touch actions comprise sliding up, sliding down, sliding to the left, sliding to the right and tapping; and
   the wearable apparatus sending the control information to the VR apparatus so as to make the VR apparatus perform operations corresponding to the control information.

2. The method of claim 1, wherein the wearable apparatus establishing the connection to the VR apparatus comprises:

when the wearable apparatus is allowed to establish a connection with the VR apparatus, the wearable apparatus sending a connection-establishment response to the VR apparatus, and the connection between the wearable apparatus and the VR apparatus being established successfully.

3. The method of claim 1, wherein the wearable apparatus establishing a connection to the VR apparatus comprises:

when the wearable apparatus is not allowed to establish connection to the VR apparatus, the wearable apparatus sending a response denying the connection establishment to the VR apparatus, and the wearable apparatus and the VR apparatus failing to establish connection therebetween.

4. The method of claim 1, wherein the wearable apparatus is connected to the VR apparatus via a Bluetooth connection or a WiFi connection.

5. A wearable apparatus for controlling a virtual reality (VR) apparatus, comprising a communication circuit, a processor, and a touch screen which are connected to one another successively;

the communication circuit establishes a connection to the VR apparatus, and is configured to acquire control request information generated by the VR apparatus, wherein the control request information is configured to request the wearable apparatus to control the VR apparatus;

the processor displays a control interface on the touch screen based on the control request information, generates corresponding control information based on at least one of touch actions performed on the control interface, and further sends the control information to the VR apparatus via the communication circuit so as to control the VR apparatus via the control information;

wherein the control interface is black, the touch actions comprise sliding up, sliding down, sliding to the left, sliding to the right and tapping.

6. The wearable apparatus of claim 5, wherein the communication circuit is connected to the VR apparatus via a Bluetooth connection or a WiFi connection.

7. The wearable apparatus of claim 5, wherein the wearable apparatus is a smartwatch.

8. The method of claim 1, wherein the control interface comprises a back key at an upper-left corner of the wearable apparatus; and the control interface is closed when the back key is pressed.

9. The wearable apparatus of claim 5, wherein the control interface comprises a back key at an upper-left corner of the touch screen; the control interface is closed and the touch screen returns to its former state when the back key is pressed.

10. A non-transitory readable medium comprising program instructions that, when executed by a processor of a wearable apparatus, cause the processor to perform a method for controlling a virtual reality (VR) apparatus, the method comprises:

establishing a connection to the VR apparatus and receiving control request information generated by the VR apparatus, wherein the control request information is configured to request the wearable apparatus to control the VR apparatus;

displaying a control interface based on the control request information, wherein the control interface is black;

acquiring at least one of touch actions on the control interface, and generating corresponding control information based on the at least one of touch actions, wherein the touch actions comprise sliding up, sliding down, sliding to the left, sliding to the right and tapping; and sending the control information to the VR apparatus so as to make the VR apparatus perform operations corresponding to the control information.

11. The non-transitory readable medium of claim 10, wherein the control interface comprises a back key at an upper-left corner of the wearable apparatus; and the control interface is closed when the back key is pressed.

12. The non-transitory readable medium of claim 10, wherein the wearable apparatus is a smart watch.

* * * * *